United States Patent
Legendre et al.

(10) Patent No.: US 6,790,422 B1
(45) Date of Patent: Sep. 14, 2004

(54) CATALYTIC TREATMENT OF GASEOUS EFFLUENTS CONTAINING VARYING AMOUNTS OF SULFUR COMPOUNDS

(75) Inventors: Olivier Legendre, Herblay (FR); Christophe Nedez, Sur Seine (FR)

(73) Assignee: Institut Francais du Petrole, Rueil-Malmaison (FR)

(*) Notice: Subject to any disclaimer, the term of this patent is extended or adjusted under 35 U.S.C. 154(b) by 832 days.

(21) Appl. No.: 08/914,244

(22) Filed: Aug. 19, 1997

Related U.S. Application Data

(63) Continuation of application No. 08/501,872, filed on Jul. 13, 1995, now abandoned.

(30) Foreign Application Priority Data

Jul. 13, 1994 (FR) ............................................. 9408746

(51) Int. Cl.$^7$ .......................... C01B 17/02; B01J 23/04; B01J 21/04
(52) U.S. Cl. ............................. 423/244.01; 423/244.02; 423/244.07; 423/244.09; 423/628; 423/567.1; 502/415; 502/406; 502/355
(58) Field of Search .................................. 502/415, 406, 502/355; 423/628, 567.1, 244.01, 244.02, 244.07, 244.09

(56) References Cited

U.S. PATENT DOCUMENTS

| | | | | |
|---|---|---|---|---|
| 3,856,708 A | * | 12/1974 | Carithers | 252/463 |
| 4,243,556 A | | 1/1981 | Blanton | |
| 4,252,635 A | | 2/1981 | Blanton | |
| 4,364,858 A | * | 12/1982 | Goodboy | 252/463 |
| 5,242,673 A | * | 9/1993 | Flytzani-Stephanopoulos et al. | 423/570 |
| 5,244,648 A | * | 9/1993 | Dupin et al. | 423/626 |

* cited by examiner

Primary Examiner—Walter D. Griffin
(74) Attorney, Agent, or Firm—Burns, Doane, Swecker & Mathis, L.L.P.

(57) ABSTRACT

Active alumina catalysts, well suited for the Claus reaction, for the hydrolysis of organosulfur compounds and for catalytically removing objectionable sulfur compounds from gaseous effluents comprised thereof, contain a cocatalytically effective amount of sodium values, such effective amount, expressed by weight of $Na_2O$, ranging from 1,200 ppm to 2,700 ppm.

23 Claims, 1 Drawing Sheet

Figure
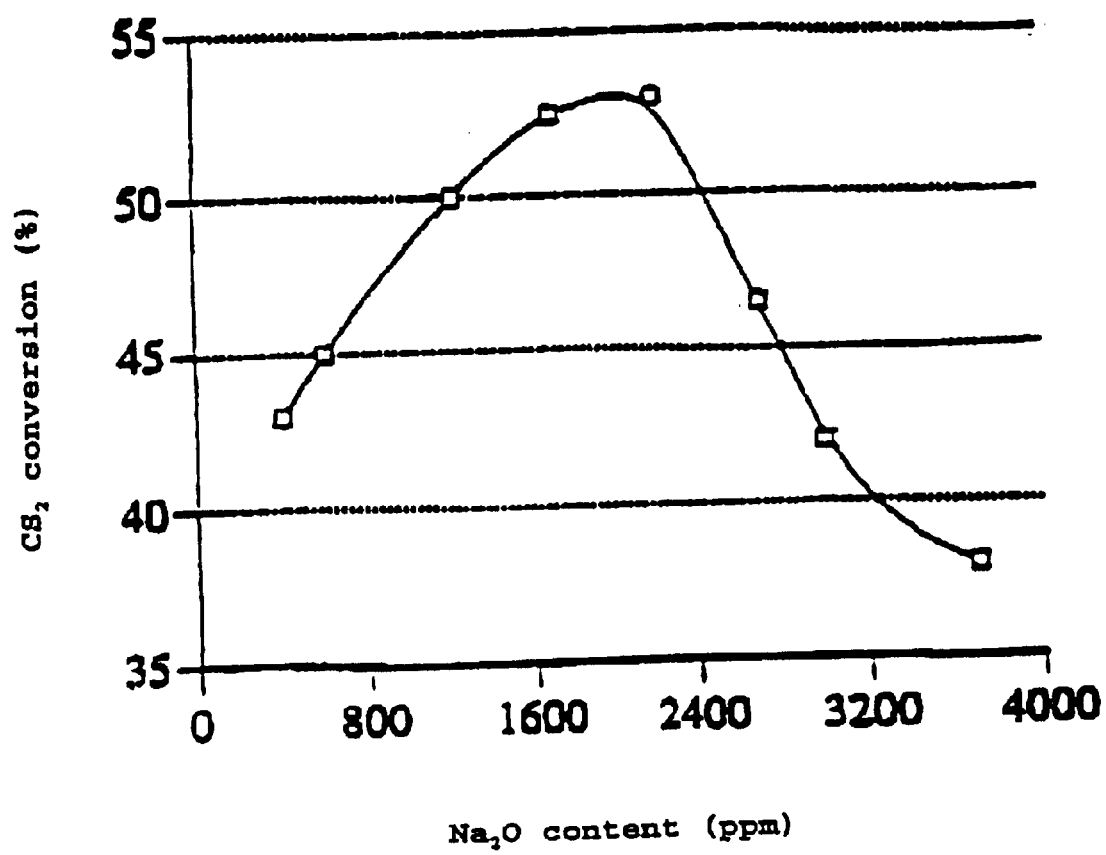

CATALYTIC TREATMENT OF GASEOUS EFFLUENTS CONTAINING VARYING AMOUNTS OF SULFUR COMPOUNDS

This application is a continuation, of application Ser. No. 08/501,872, filed Jul. 13, 1995, now abandoned.

BACKGROUND OF THE INVENTION

1. Technical Field of the Invention

The present invention relates to novel catalysts for the purification/treatment of gases, especially of gaseous industrial effluents containing sulfur compounds, particularly to recover elemental sulfur therefrom, and, more especially, to novel catalysts for the Claus reaction and/or the hydrolysis of organic sulfur compounds.

2. Description of the Prior Art

In the conventional Claus process, the recovery of sulfur from gases containing hydrogen sulfide and, optionally, organic sulfur compounds comprises two stages.

In a first step, the hydrogen sulfide is burned in the presence of a controlled amount of air to convert a proportion of the hydrogen sulfide into sulfur dioxide according to the following reaction mechanism (1):

$$H_2S + 3/2O_2 \rightarrow H_2O + SO_2 \quad (1)$$

and then, in a second step, the gaseous mixture obtained is passed through converters, in series, containing a catalyst bed wherein the actual Claus reaction (2):

$$2H_2S + SO_2 \rightarrow 3/xS_x + 2H_2O \quad (2)$$

is carried out.

The overall balance of the reaction is therefore (3):

$$3H_2S + 3/2O_2 \rightarrow 3/xS_x + 3H_2O \quad (3)$$

Furthermore, other than hydrogen sulfide, the gases may contain organic sulfur compounds such as $CS_2$ and $COS$, which are generally stable in the catalytic converters and which contribute to an increase of 20% to 50% in the emissions of $SO_2$ and of sulfur compounds into the atmosphere after the fumes have been incinerated. These very objectionable compounds are either already present in the gas to be treated, or are formed during the first oxidation step which is conducted at elevated temperature.

These compounds can be removed via several types of reactions, in particular by hydrolysis according to the mechanisms:

$$CS_2 + 2H_2O \rightarrow CO_2 + 2H_2S \quad (4)$$

$$CS_2 + H_2O \rightarrow COS + H_2S \quad (5)$$

$$COS + H_2O \rightarrow CO_2 + H_2S \quad (6)$$

this being to limit the discharge of toxic effluents at the downstream end of a sulfur plant.

These reactions are also effected in a catalyst bed, advantageously using a catalyst based on titanium, cerium oxide or zirconium oxide, or alumina.

They are generally carried out simultaneously with the Claus reaction (2) in such converters.

For this purpose, the catalysts employed must exhibit the best possible activities, as well as the best resistance to the stresses experienced during use, as a function of time.

Alumina is commonly employed as a catalyst for these applications. One of the principal reasons for its deactivation is due to the concomitant formation of sulfates at its face surfaces, which sulfates reduce its catalytic performance, frequently drastically.

SUMMARY OF THE INVENTION

It has now unexpectedly been determined that the extent of the sodium content of alumina is a primary factor in the deactivation thereof, especially by sulfate formation.

Accordingly, a major object of the present invention is the provision of novel alumina catalysts comprising an amount of sodium values which is within a certain judiciously selected range.

Briefly, the present invention thus features a catalyst for the treatment/purification of gases containing objectionable amounts of sulfur compounds and/or for the hydrolysis of organic sulfur compounds, essentially consisting of a catalytically active alumina which comprises sodium values, the sodium content of the alumina ranging from 1,200 ppm to 2,700 ppm of $Na_2O$ by weight thereof.

BRIEF DESCRIPTION OF THE DRAWING

The FIGURE of Drawing is a graph plotting the conversion of $CS_2$ as a function of the $Na_2O$ content in various alumina catalysts.

DETAILED DESCRIPTION OF BEST MODE AND PREFERRED EMBODIMENTS OF THE INVENTION

More particularly according to the present invention, the particular $Na_2O$ concentration range was completely unexpected and surprising insofar as the state of this art mandated sodium contents that were as low as possible because of the detrimental effect of $Na_2O$ vis-a-vis alumina over the course of a Claus reaction.

The sodium content of the alumina of the catalysts according to the invention advantageously ranges from 1,500 ppm to 2,500 ppm and preferably from 1,700 to 2,200 ppm.

The catalysts of this invention include alumina containing sodium as the catalytically active component, in a weight proportion which advantageously ranges from 0.5% to 100% (of alumina+sodium), and preferably from about 60% to 99%, relative to the total weight of the final catalyst.

The catalysts according to the present invention may also include, in a proportion which is smaller in relation to the alumina, other oxides such as titanium dioxide, silica, zirconium oxide, cerium oxide, tin oxide, oxides of trivalent rare earths, molybdenum oxide, cobalt oxide, nickel oxide, iron oxide, and the like.

The oxides other than alumina may constitute from 0% to 40% of the weight of the catalyst.

The catalysts of the invention may additionally include one or more constituents selected from among the clays, silicates, alkaline earth metal or ammonium sulfates, ceramic fibers, asbestos fibers, etc.

They may also include additives for facilitating the forming or shaping thereof and additives for improving their final mechanical properties.

Particularly exemplary such additives include cellulose, carboxymethyl cellulose, carboxyethyl cellulose, tallol, xanthan gums, surface-active agents, flocculating agents such as polyacrylamides, carbon black, starches, stearic acid, polyacrylic alcohol, polyvinyl alcohol, biopolymers, glucose, polyethylene glycols, and the like.

The alumina employed for the catalyst according to the invention may be prepared, as described in FR-A-2,527,197 (which corresponds to U.S. Pat. No. 4,514,511), via treatment, in an aqueous medium which has a pH lower than 9, of an active alumina powder obtained by rapid dehydration of hydrargillite in a stream of hot gases, spray-drying and then calcining according to the technique described in EP-A-15,196.

It is also advantageously prepared, as described in FR-A-2,449,650 (which corresponds to U.S. Pat. No. 4,344,928), via treatment of an active alumina powder which has a poorly crystallized and/or amorphous structure in an aqueous medium which has a pH lower than 9, an alumina of "poorly crystallized structure" being as defined therein.

The alumina according to the invention may also be prepared by mixing an alumina obtained according to the process described in FR-A-2,449,650 with an alumina obtained according to the process described in FR-A-2,527,197, comprising a rapid dehydration of aluminum hydroxides or oxyhydroxides and, more particularly, of hydrargillite in a stream of hot gases. This rapid dehydration is carried out in any suitable apparatus, by means of a stream of hot gases, the inlet temperature of the gases into the apparatus generally ranging from approximately 400° to 1,2000° C., and the time of contact of the hydroxide or oxyhydroxide with the hot gases generally ranging from a fraction of a second to 4–5 seconds. This process is described in greater detail in FR-A-1,108,011. The mixture of an alumina obtained by the process described in FR-A-2,449,650 with an alumina obtained by the process described in FR-A-2,527,197 permits, merely by adjusting the proportion of each of the aluminas thus obtained, the preparation of a final alumina exhibiting the desired $Na_2O$ content. Indeed, an alumina prepared by rapid calcining of aluminum hydroxides or oxyhydroxides produces an alumina which has a high $Na_2O$ content, on the order of 3,500 ppm. After treatment in an aqueous medium at a pH lower than 9, the $Na_2O$ content is considerably decreased (less than 1,000 ppm). The addition of alumina prepared according to the second of the above processes then enables production of an alumina which has an $Na_2O$ content of from 1,200 ppm to 2,700 ppm.

The catalyst according to the invention is next converted into any appropriate form or shape, optionally after impregnation onto a typically refractory support.

For example, the catalyst may be shaped by kneading the various constituents of the catalyst and extruding the inorganic paste thus obtained, by tabletting, by shaping into the form of beads using a rotary coating pan or a drum, or by any other known means for agglomerating a powder containing alumina and, optionally, other ingredients selected from among those indicated above.

It may also comprise an alumina to which other ingredients have optionally been added and which is merely crushed; thus, it does not have any special form.

It is advantageous, however, that the alumina be in the form of beads having a diameter ranging from 1.5 to 10 mm and preferably from 3 to 7 mm.

The catalysts according to the present invention are highly efficient, both for catalyzing the Claus reaction (equation (2)), as well as reactions of hydrolysis of organic sulfur compounds (equations (4), (5) and (6)).

Thus, the present invention therefore also features the use of a catalyst as described above for treating gases containing objectionable or contaminating amounts of sulfur compounds for the production of elemental sulfur, via Claus reaction, and for treating gases containing organic sulfur compounds via a hydrolysis reaction.

This invention lastly features processes for the treatment of gases containing sulfur compounds via Claus reaction or via hydrolysis, by passing these gases over a catalyst bed, at least a proportion of the catalyst comprising a catalyst as described above.

In order to further illustrate the present invention and the advantages thereof, the following specific examples are given, it being understood that same are intended only as illustrative and in nowise limitative.

In said examples to follow, the activity or efficacy of the catalysts was as shown on the attached FIGURE of Drawing, plotting the conversion of $CS_2$ as a function of the $Na_2O$ content in the catalysts according to the invention.

EXAMPLE 1

Hydrargillite was dehydrated rapidly at 1,000° C. by means of a stream of hot gas to obtain a product A. A contained 3,600 ppm of $Na_2O$. A proportion of product A was treated in an aqueous medium according to the process described in EP-A-15,196, to provide a product B; its $Na_2O$ content was then 800 ppm by weight. A 50:50 mixture of aluminas A and B was formulated, then granulated into beads having a diameter of from 3.1 to 6.3 mm. These beads then had a sodium content of 2,200 ppm by weight, expressed as $Na_2O$.

EXAMPLE 2

Catalysts which had $Na_2O$ contents equal to 400, 600, 1,200, 1,700, 2,200, 2,700, 3,000 and 3,700 ppm were prepared according to the procedure of Example 1.

All of the catalysts exhibited the following physicochemical characteristics: specific surface: 360 (±10)m$^2$/g, bead particle size: 3.1–6.3 mm, pore volume of pores of diameter greater than 0.1 μm: 18.5 ml/100 g of alumina, pore volume of pores of diameter greater than 1 μm: 15.5 ml/100 g of alumina.

These catalysts were tested for their activity in the first reactor ($R_1$) and in the second reactor ($R_2$) in a Claus process. Thus, the Claus unit comprised two identical reactors $R_1$ and $R_2$, which were placed in series and charged with the same catalyst, the gas to be treated being introduced successively into $R_1$ and then $R_2$.

In $R_1$ the reaction which was crucial, being the most difficult to complete, was the hydrolysis of COS and, primarily, of $CS_2$. In $R_2$ the lower temperature and the lower $H_2S$ content rendered the traditional Claus reaction more discriminating, because of the more preoccupying problems related to the formation of alumina sulfate.

The trends determined in hydrolysis of $CS_2$ in $R_1$ and in the Claus reaction in $R_2$ were apparent: if a catalyst A was more efficient than a catalyst B in $R_1$, then A was also more efficient than B in $R_2$.

Accordingly, only the results of catalysis of the hydrolysis of $CS_2$ in reactor $R_1$ are reported here.

The tests for catalytic activity were conducted by contacting with the catalysts a gas whose composition by volume was the following:

| | |
|---|---|
| $H_2S$ | 6% |
| $SO_2$ | 4% |
| $CS_2$ | 1% |
| $H_2O$ | 30% |
| $N_2$ | 59% |

The contacting was in a reactor at 320° C., operating isothermally, with an oxygen content of 10 ppm by volume and utilizing a contact time of 2 s (under standard temperature and pressure conditions (STPC)).

For an identical reactor volume filled with catalyst and an identical inlet flow rate of gas to be treated, the performance of the different catalysts was compared by measuring the hydrolysis activity and by analyzing, using gas phase chromatography, the $H_2S$, the $SO_2$, the COS and the $CS_1$ present in the gases exiting the reactor.

The $CS_2$ conversion was thus measured after a steady state had been obtained in the content of reaction products exiting the reactor.

In each catalyst test, the $CS_2$ conversion corresponding to the catalyst employed was measured.

The results are illustrated in the attached FIGURE of Drawing, which shows that, with the $Na_2O$ range of from 1,200 to 2,700 ppm, the conversion of $CS_2$ was highly advantageous.

This conversion was more particularly advantageous over the range which is preferred according to this invention, of from 1,700 to 2,200 ppm.

While the invention has been described in terms of various preferred embodiments the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An activated alumina catalyst comprising a cocatalytically effective amount of sodium values for conversion of $CS_2$, said effective amount, expressed by weight of $Na_2O$, ranging from 1,200 pm to 2,500 ppm.

2. The activated alumina catalyst as defined by claim 1, said effective amount, expressed by weight of $Na_2O$, ranging from 1,500 ppm to 2,500 ppm.

3. The activated alumina catalyst as defined by claim 2, said effective amount, expressed by weight of $Na_2O$, ranging from 1,700 ppm to 2,200 ppm.

4. The activated alumina catalyst as defined by claim 1, further comprising silica and/or at least one oxide of titanium, zirconium, cerium, tin, a rare earth, molybdenum, cobalt, nickel or iron.

5. The activated alumina catalyst as defined by claim 1, further comprising a clay, a silicate, an alkaline earth metal or ammonium sulfate, ceramic fibers, asbestos fibers, or combination thereof.

6. The activated alumina catalyst as defined by claim 1, further comprising cellulose, carboxymethyl cellulose, carboxyethyl cellulose, tallol, a xanthan gum, a surface-active agent, a flocculating agent, a polyacrylamide, carbon black, a starch, stearic acid, polyacrylic alcohol, polyvinyl alcohol, a biopolymer, glucose, a polyethylene glycol, or combination thereof.

7. The activated alumina catalyst as defined by claim 1, comprising extrudates, tablets, or beads thereof.

8. The activated alumina catalyst as defined by claim 7, comprising a plurality of beads having a diameter size ranging from 1.5 mm to 10 mm.

9. The activated alumina catalyst as defined by claim 8, said beads having a diameter size ranging from 3 mm to 7 mm.

10. The activated alumina catalyst as defined by claim 1, deposited onto support substrate therefor.

11. A catalyst comprising at least 0.5% by weight of an activated alumina catalyst comprising a cocatalytically effective amount of sodium values, said effective amount, expressed by weight of $Na_2O$, ranging from 1,200 ppm to 2,700 ppm.

12. A catalyst comprising from 60% to 99% by weight of activated alumina catalyst comprising a cocatalytically effective amount of sodium values, said effective amount, expressed by weight of $Na_2O$, ranging from 1,200 ppm to 2,700 ppm.

13. In a catalyzed Claus reaction for the production of elemental sulfur, the improvement which comprises, as the catalyst therefor, an activated alumina catalyst comprising a cocatalytically effective amount of sodium values, said effective amount, expressed by weight of $Na_2O$, ranging from 1,200 ppm to 2,700 ppm.

14. In a process for the catalyzed hydrolysis of an organosulfur compound, the improvement which comprises, as the catalyst therefor, an activated alumina catalyst comprising a cocatalytically effective amount of sodium values, said effective amount, expressed by weight of $Na_2O$, ranging from 1,200 ppm to 2,700 ppm.

15. In a process for catalytically removing objectionable sulfur compounds from gaseous effluents comprised thereof, the improvement which comprises, as the catalyst therefor, an activated alumina catalyst comprising a cocatalytically effective amount of sodium values, said effective amount, expressed by weight of $Na_2O$, ranging from 1,200 ppm to 2,700 ppm.

16. The activated alumina catalyst as defined by claim 1, wherein the catalyst has a specific surface of 350 to 370 $m^2/g$.

17. The catalyst as defined by claim 11, wherein the catalyst has a specific surface of 350 to 370 $m^2/g$.

18. The catalyst as defined by claim 12, wherein the catalyst has a specific surface of 350 to 370 $m^2/g$.

19. The reaction as defined by claim 13, wherein the catalyst has a specific surface of 350 to 370 $m^2/g$.

20. The process as defined by claim 14, wherein the catalyst has a specific surface of 350 to 370 $m^2/g$.

21. The process as defined by claim 15, wherein the catalyst has a specific surface of 350 to 370 $m^2/g$.

22. The activated alumina catalyst as defined by claim 1, comprising beads having a diameter of 3.1 to 6.3 mm and specific surface area of 350 to 370 $m^2/g$.

23. The activated alumina catalyst as defined by claim 1, comprising beads having pore volume of alumina of pores of diameter greater than 0.1 $\mu$m of 18.5 ml/100 g and pore volume of pores of alumina of diameter greater than 1 $\mu$m of 15.5 ml/100g.

* * * * *